March 20, 1973     J. M PRINCE     3,721,490
REMOVEABLE PROTECTIVE SIDE SHIELD ASSEMBLY
FOR MOUNTING ON SPECTACLES
Filed May 11, 1971
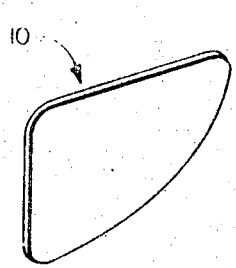
Fig. 1
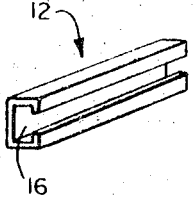
Fig. 2
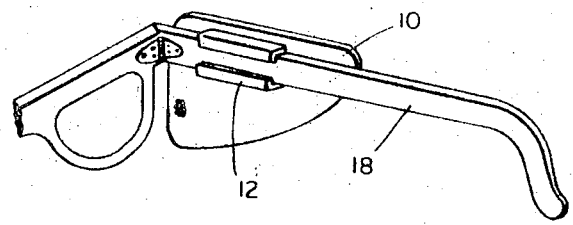
Fig. 3
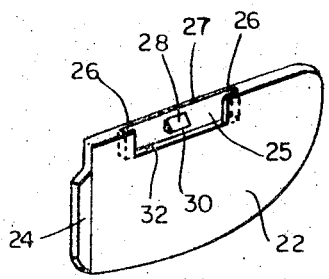
Fig. 4
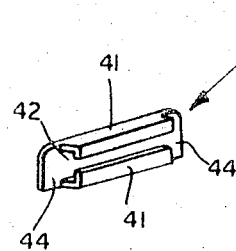
Fig. 5
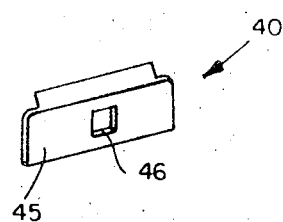
Fig. 6
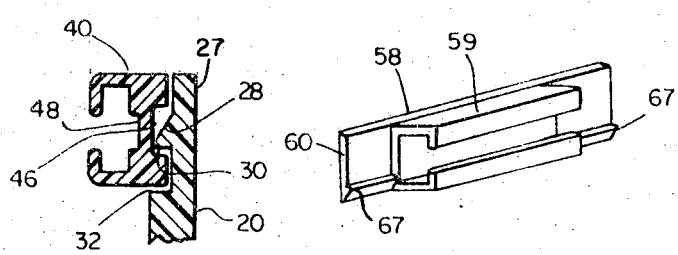
Fig. 7     Fig. 10     Fig. 9
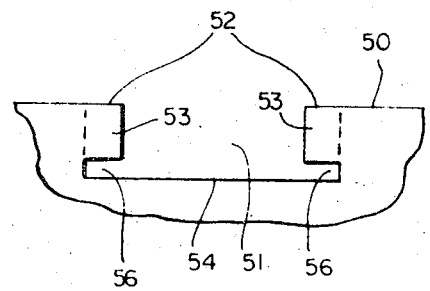
Fig. 11
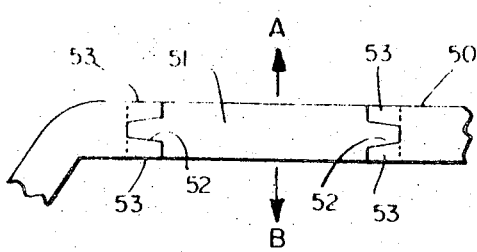
Fig. 8
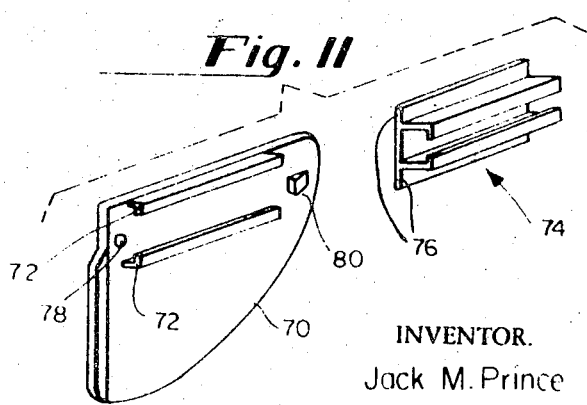
INVENTOR.
Jack M. Prince United States Patent Office 3,721,490
Patented Mar. 20, 1973

3,721,490
REMOVABLE PROTECTIVE SIDE SHIELD ASSEMBLY FOR MOUNTING ON SPECTACLES
Jack M. Prince, Reading, Pa., assignor to
ESB Incorporated
Filed May 11, 1971, Ser. No. 142,272
Int. Cl. G02c 7/16, 9/00
U.S. Cl. 351—47                                3 Claims

ABSTRACT OF THE DISCLOSURE

A removeable clear protective side shield for spectacles is described in which a single universal side shield type is combined with one of several shapes of support slideably mountable on the spectacle temple so as to give a customer choice in finding a shield suitable for mounting on his particular spectacle design. Once a choice of support has been made, a shield is attached to the chosen support. Several attaching means are described including a mechanical snap lock that prevents subsequent separation of the two parts.

BACKGROUND OF THE INVENTION

(1) Field of the invention

This invention relates to safety devices for protecting the human eye. In particular, it relates to a protective eye side shield to be attached to the temple pieces of spectacles.

(2) Description of the prior art

Devices for preventing flying objects from reaching the eye from directions not protected by the spectacle lens and frame have long been known. Such devices often are called "side shields." Side shields have been made from opaque materials including metals and fiber board or of transparent materials such as plastics. Transparent shields are desirable because they permit full angle vision on the part of the wearer, a feature that has been found to be extremely helpful in promoting safety in many forms of occupation.

There are numerous types of safety glasses on the market, any of which may well be supplied with side shields. Recently passed legislation requires that all spectacle lenses made in this country will have to be of the safety variety. It can be anticipated that this will cause an increased demand for side shields and that the side shields will have to be adaptable for use with many more types and sizes of spectacles than heretofore. For use on everyday spectacles, such eye shields should be readily removable so that the wearer can easily change from a highly protective spectacle to normal use spectacle with minimum effort and cost.

Unfortunately, there are a great many designs, certainly in the thousands, of spectacles used in the United States. It is desirable for a supplier to have side shields available for most or at least a great many of these designs.

It would be possible to design a specific side shield for every known style and size of spectacle. However, this would entail an exorbitant mold cost for the manufacturer, excessive inventory requirements for the supplier, and consequent high cost to the public—the ultimate consumer.

SUMMARY OF THE INVENTION

In this invention, a clear molded plastic side shield is permanently attached to a selected one of many shapes of side shield mounting piece, the latter designed to slide fit on a spectacle temple piece. Attachment means include normal fastening means such as adhesives, rivets and welding, it also includes a mechanical locking fastener permitting selection of the proper mounting piece by the user and the attachment thereto of the side shield without the need for any tools or other materials. A further feature of the invention is that the mounting piece may be molded from a different material than the side shield thereby permitting the selection of the best material for each of the parts.

It will be seen that this invention enables a supplier to provide maximum coverage for his customers with a minimum inventory of parts and lowest possible tooling costs. A single high cost pair of molds (right and left) for molding the side shields can be used. With this, the supplier can have a multitude of low most mounting piece molds thus enabling him to fill any customer's needs at minimum expense. In a particular embodiment, the mounting piece is made from an extrusion; an expedient that provides parts lower in cost than molded parts.

BRIEF DESCRIPTION OF THE DRAWINGS

FIG. 1 depicts a clear plastic or glass side shield;
FIG. 2 depicts a side shield support piece for use with the shield of FIG. 1;
FIG. 3 shows the parts of FIGS. 1 and 2 attached and mounted on the temple piece of a pair of spectacles;
FIG. 4 depicts a second embodiment of the invention;
FIGS. 5 and 6 show the front and back view of the support piece to be used with the shield of FIG. 4;
FIG. 7 shows a cross section of the support piece of FIGS. 5 and 6 mounted in the side shield of FIG. 4;
FIG. 8 shows a top view of still another embodiment of the invention;
FIG. 9 shows a side view of the embodiment of FIG. 8;
FIG. 10 shows a view of the support piece for use with the side shield of FIGS. 8 and 9; and
FIG. 11 shows a side shield and support piece utilizing another embodiment of the invention.

DESCRIPTION OF THE PREFERRED EMBODIMENT

In FIG. 1, a simple side shield 10 of clear nonbreakable material is shown. The part can be made by blanking from sheet or it can be made by a molding process. It is desirable that the shield have smooth rounded edges and that it is free of residual strains that might cause crazing at a later date. This form of shield can be made from a light transmitting material such as a clear or tinted plastic such as cellulose acetate, methyl methacrylate, or polycarbonate, or it can be made from safety glass.

In FIG. 2, a simple side shield support piece 12 is shown. The cross section of the support piece is chosen to slip over a particular spectacle temple piece. Thus, the support piece might be of a tubular section. A slotted tubular or C-shaped cross section, as shown in FIG. 2 for example, is, however, preferred. In FIG. 2, the inside 16 is dimensioned to slide over a particular temple piece. This shape allows more flexibility and adaptability to fitting and holding onto a temple piece whose cross sectional dimensions may not be exactly those of the support piece than would normally be found with a tubular section. It is also necessary that the support piece have some springiness so that it will clamp onto and hold the temple piece when it is located thereon. It is also desirable that the support piece be made from a resilient or tough rather than a brittle material so that it will not be damaged in the event that a shock is transmitted to it from the side shield. However, it need not transmit light. Suitable materials for the support piece include natural and synthetic rubbers vulcanized to a medium hardness, plastics such as polyethylene, polypropylene, high impact polyvinyl chloride, polyamides, etc., or the common metals such as steel, aluminum, brass, etc.

FIG. 3 illustrates parts 1 and 2 fastened together and located on a typical spectacle temple 18. In this assembly, parts 10 and 12 may be fastened together by cementing or welding or by the use of mechanical fastener means such as rivets, screws, nuts and bolts, etc.

All the above means of fastening the side shield to the support piece involve either extra materials or tools or both. Although they are desirable means for making up large quantities of similar parts, they are not desirable at the level of the final customer. In order to provide a means of permanently attaching the support piece to the side shield that is in keeping with a small volume consumer operation, the design of attachment shown in FIGS. 4 to 7 is provided. FIG. 4 is a view of a side shield 20 having a more or less flat protective side surface 22 and a second protective portion 24 at an angle to 22. This side shield is molded from a clear or tinted material such as cellulose acetate. Other materials such as clear or tinted methyl methacrylate, polyvinyl chloride, high impact polystyrene, polycarbonate, etc. may be used. However, in each instance, the reactivity of the material with chemicals it may encounter must be studied.

A cavity 25 is formed in an upper portion of the shield 20. Two vertical slots 26 form the ends of the cavity 25 and a horizontal shoulder portion 32 forms the base of the cavity. A wall portion 27 of the shield forms a back wall of the cavity. A ramp-shaped projection 28 is located between slots 26 on the back wall 27. The base 30 of the projection 28 faces the base 32. For convenience in the manufacture, the slots 26 are preferably co-planar and parallel.

FIGS. 5 and 6 show the front and back views, respectively, of the support piece 40 used in association with the shield of FIG. 4. This piece, molded or fabricated from a tough material not necessarily clear such as polyvinyl chloride, polyethylene, polypropylene, polyamine, ABS, or other such tough plastic material, has rail members 41 molded on one side. The rail members form a generally C-shaped channel 42. Ears 44 are molded or fabricated on either end. These ears are dimensioned to fit in the slots 26 of the side shield.

On the back 45 of part 40 a depression 46 is formed slightly larger than the ramp 28. It is desirable to form the depression with at least its bottom approximately perpendicular to the back 45 of support piece 40. The exact shape of the remainder of the depression is not critical.

It will be seen that as the mounting piece 40 is slipped into the slots 26 of the side shield, the two plastic parts are forced apart by the action of the ramp 28. However, when the mounting piece is pushed all the way down to the point where support piece 40 rests against shoulder 32, the ramp locates within the depression 46 and the plastic pieces resume their original shape. The support piece is now firmly locked to the side shield by the action of the ramp 28 with the depression 46 and cannot easily be removed therefrom. FIG. 7 shows a cross section at the ramp of the two parts in the final or locked condition. The locking action of the base 30 of the ramp 28 in the depression 46 is clearly shown. This form of attachment can best be described as a slideable, self-locking attachment means, other forms of which will be subsequently described. The groove 48 in FIG. 7 represents a refinement of the design of the support piece. This groove permits the support piece to fit over the hinge rivets found on certain designs of temple pieces.

With certain designs of spectacle, the temple pieces locate some distance from the face of the wearer. In this case, it may be desirable to mount the shield inside the temples rather than outside. FIGS. 8 and 9 show an alternate design which allows the support piece to mount in either direction.

In this embodiment of the invention, a notch 51 is formed in the side shield 50, as shown in both FIG. 8 and FIG. 9. In the ends of the notch 51 wings 53 form the slots 52. The wings 53 do not extend to the bottom 54 of the notch 51 but stop somewhat above so that there are openings 56 between the bottom of the wings and the bottom 54 of the notch 51. The slots 52 formed by the wings 53 are preferably coplanar and parallel for ease of manufacture.

FIG. 10 illustrates the support piece 58 used with the side shield 50 of FIGS. 8 and 9. This comprises a body portion 59 having a generally C-shaped cross section. Ears 60 extend from the two ends of the body 59. Enlargements 67 are located at the bottom of the ears 60. A desirable shape for enlargements 67 is suggested by an arrowhead as shown but other shapes such as knobs, etc. will serve. It will be apparent that when the support piece 58 is forced into the notch 51 of side shield 50 that the wings 53 will be sprung outward by the enlargements 67. However, when the support piece 58 is pushed all the way down, the enlargements 67 will locate in the openings 56 and the wings 53 will spring back to their normal position. The support piece 58 will then be securely held to the side shield 50 and will be very difficult to remove. It is also apparent that the two ends of support piece 58 as well as the two ends of notch 51 can be symmetrical. In this case, the support piece can be located facing in either of two directions shown as A and B in FIG. 8. When the support piece 58 is attached to the side shield 50 so that the C section faces direction B, the assembly will take the position shown in FIG. 3 with shield outside of the temple. However, if the support piece 58 is attached to the side shield 50 so that the C section faces direction A, the side shield will locate inside of the temple piece. It is to be noted that the exact shape of the enlargements 67 is not critical, the form described is just one of many useable shapes.

In still another form of the invention, the slot in the shield into which the support piece fits runs horizontally instead of vertically. In FIG. 11, the side shield 70 is shown with horizontal slots 72 formed therein, i.e. parallel to the length of the temple piece. Support piece 74 with ears 76 extending from the edges thereof slips into the slots.

Locking means working on the same principles as those described above may be used to hold the support piece 74 in place on the side shield 70. For example, a button 78 formed on the shield 70 prevents the support piece from sliding too far forward while the ramp-shaped projection 80 allows the support piece to be slipped into the slots 72 but will prevent its removal therefrom once it is pushed in all the way.

A design such as that shown in FIG. 11 permits the support piece 74 to be made by an extrusion process. A rod having the required cross section is extruded and cut into the required length. By making use of extrusion techniques, the tooling costs as well as other manufacturing costs of the support piece can be reduced to a minimum.

Having described my invention and given some examples of its several embodiments, I now claim:

1. A removable, protective, two piece side shield assembly for mounting on a spectacle temple piece which comprises:
   (a) a side shield made from a first light transmitting material, the side shield having: a cavity formed therein, a first end of the cavity being defined by a first slot, and a second end of the cavity being defined by a second slot; a wall portion forming a backwall to the cavity, and a ramp-shaped projection having a base formed on the backwall of the cavity, the base of the ramp facing the base of the cavity; and
   (b) a side shield support piece made from a second resilient material, the support piece having:
   a first side with rail members formed thereon, the rail members defining a generally C-shaped channel;
   a second side defining a depression therein;
   a first end with a first ear thereon;

a second end with a second ear thereon; the first ear of the support piece located in the first slot of the shield, the second ear of the support piece located in the second slot of the shield and the ramp-shaped projection of the shield located in the depression in the side shield support piece.

2. A removable, protective, two piece side shield assembly for mounting on a spectacle temple piece which comprises:
(a) a side shield made from a first light transmitting material, the side shield having therein a notch with ends and a bottom, a pair of first wings on a first end of the notch defining a first slot and a pair of second wings on a second end of the notch defining a second slot, the first wings and the second wings stopping above the bottom of the notch to form openings; and
(b) a side shield support piece made from a second resilient material, the support piece having a generally C-shaped channel formed in a first side thereof and having a first ear on a first end and a second ear on the second end thereof, the first ear having an enlargement at the bottom thereof and the second ear having an enlargement at the bottom thereof; the first ear located within the first slot, the second ear located within the second slot, the first enlargement being located in the opening below the first slot and above the bottom of the notch, and the second enlargement being located in the opening below the second slot and above the bottom of the notch.

3. A removable, protective, two piece side shield assembly for mounting on a spectacle temple piece which comprises:

(a) a side shield made of a first light transmitting material, the side shield having a first horizontal slot located near the top of the shield and a second horizontal slot located below the first slot, the slots being substantially parallel to the length of the temple piece;
(b) a side shield support piece made of a second resilient material, the support piece having a generally C-shaped channel formed in a first side thereof and having a first ear extending from a first edge thereof, and a second ear extending from a second edge thereof; the first ear of the support piece being located in the first slot of the shield and the second ear of the support piece being located in the second slot of the shield; and,
(c) cooperative locking means forming a part of the side shield comprising a first button-like projection located near the first end of the slots and a second projection located near the other end of the slots; the locking means serving to prevent the removal of the support piece from the side shield after it is inserted into the slots.

References Cited

UNITED STATES PATENTS 3,505,679  4/1970  Bennett _____ 351—47

DAVID SCHONBERG, Primary Examiner

R. L. SHERMAN, Assistant Examiner

U.S. Cl. X.R.

2—13